(12) United States Patent
Tonooka

(10) Patent No.: US 7,841,744 B2
(45) Date of Patent: Nov. 30, 2010

(54) ILLUMINATION APPARATUS

(75) Inventor: Masahito Tonooka, Hino (JP)

(73) Assignee: Olympus Corporation, Tokyo (JP)

( * ) Notice: Subject to any disclaimer, the term of this patent is extended or adjusted under 35 U.S.C. 154(b) by 230 days.

(21) Appl. No.: 12/142,936

(22) Filed: Jun. 20, 2008

(65) Prior Publication Data
US 2009/0016059 A1 Jan. 15, 2009

(30) Foreign Application Priority Data
Jun. 21, 2007 (JP) ............... 2007-164205

(51) Int. Cl.
*F21S 8/00* (2006.01)
(52) U.S. Cl. ............... 362/268; 362/294; 359/390
(58) Field of Classification Search ................ 362/268, 362/294, 373; 359/385, 387, 389, 390, 368
See application file for complete search history.

(56) References Cited
U.S. PATENT DOCUMENTS
2,471,879 A * 5/1949 Lowber et al. ............... 359/389

2,959,097 A * 11/1960 Mollring .................. 359/385
3,297,391 A * 1/1967 Benford et al. ............. 359/389
3,499,715 A * 3/1970 Baumgartner et al. ....... 356/397
7,586,677 B2 * 9/2009 Bertschi et al. ............. 359/385

FOREIGN PATENT DOCUMENTS
JP 2006-113392 A 4/2006

* cited by examiner

*Primary Examiner*—John A Ward
(74) *Attorney, Agent, or Firm*—Holtz, Holtz, Goodman & Chick, PC

(57) ABSTRACT

The illumination apparatus comprises a light source unit which has a LED for emitting illumination light, and a condenser lens for collecting the illumination light, and a main body of the illuminator of the apparatus which holds the light source unit and guides the illumination light. The light source unit comprises a heat dissipation plate which holds LED, and emits the heat emitted from LED 11; and a lens frame which holds the collector lens and the heat dissipation plate so that the relative position of LED to the collector lens may be changed. The main body of the illuminator has a connection hole for connecting communicatively the inside of the main body of the apparatus to the outside, and holds the light source unit by inserting the lens frame into the connected hole.

8 Claims, 10 Drawing Sheets

ILLUMINATION APPARATUS

This application claims benefits of Japanese Patent Application No. 2007-164205 filed in Japan on Jun. 21, 2007, the contents of which are hereby incorporated by reference.

BACKGROUND OF THE INVENTION

1. Field of the Invention

The present invention relates to an illumination apparatus comprising a light source unit which has a light source for emitting illumination light, and a condenser lens for collecting illumination light, and a main body of the apparatus which holds the light source unit and guides the illumination light.

2. Description of the Related Art

Conventionally, in an illumination apparatus of a microscope, a lamp house that is provided with a light source (a halogen lamp, a xenon lamp, or a mercury lamp) in its inside has been used (for example, refer to Publication of the Japanese unexamined patent application, Toku Kai 2006113392). Such lamp house is connected to the backside of the main body of the illumination apparatus, and the illumination light emitted from a lamp light source is supplied to a relay optical system which is arranged in the main body of the illumination apparatus.

SUMMARY OF THE INVENTION

The illumination apparatus according to the present invention is characterized in that in an illumination apparatus provided with a light source unit which has a light source for emitting illumination light, and a condenser lens for collecting illumination light, and a main body of the apparatus which holds the light source unit and guides the illumination light, the light source unit comprises a heat dissipation component which holds the light source and dissipates the heat from the light source, and an lens holding frame which holds the condenser lens, and holds the heat dissipation component so that a relative position of the light source to the condenser lens may be changed, wherein the main body of the apparatus has a connection hole for connecting communicatively the inside of the main body of the apparatus to outside, and holds the light source unit by inserting the lens frame into the connected hole.

According to the present invention, it is characterized in that the lens frame is fitted in to the connected hole.

According to the present invention, it is characterised in that the lens frame holds the heat dissipation component at the end, wherein the heat dissipation component is extended at least over the part around the circumference of the end portion and in the main body of the apparatus the lens frame is inserted into the connection hole, wherein the light source unit is held by touching the extended part of the heat dissipation component to the lens frame to the circumference portion of the connection hole.

According to the present invention, it is characterised in that the main body of the apparatus, holds the extended portion by using screw to be installed to the circumference portion of the connection hole.

According to the present invention, it is characterised in that the lens frame has an end surface perpendicular to the optical axis of the condenser lens, and holds the heat dissipation component so as to enable to slide to the end surface.

According to the present invention, it is characterized in that the lens frame has a movement mechanism which changes a relative position of the heat dissipation component to the condenser lens along the direction of the optical axis of the condenser lens.

According to the present invention, it is characterized in that the lens frame has an end surface perpendicular to the optical axis of the condenser lens, and one or more interval adjustment components which is arranged so that it may be attached and detached between the end surface and the heat dissipation component, wherein the heat dissipation component is held so that it may slide to the interval adjustment component.

According to the present invention, it is characterized in that the main body of the apparatus is held so that the light source unit may be attached and detached.

According to the present invention, it is characterized in that the light source is a semiconductor light emission element.

According to the present invention, it is characterized in that the main body of the apparatus has a relay optical system in which an image of the light source is forming by condensing the illumination light in collaboration with the condenser lens.

According to the present invention, it is characterized in that the relay optical system is constituted such that an image of the light source image is formed near a pupil of the objective lens optically connected to the main body of the apparatus.

According to the present invention, downsizing of the whole apparatus can be promoted, and a space for mounting can be made small or space-saving. Moreover, by suppressing degradation of the light source by generation of heat, the life time of the light source can be extended, and further the adjustment of a relative position of the light source to a condenser lens can be carried out.

These and other features and advantages of the present invention will become apparent from the detailed description of the preferred embodiments when taken in conjunction with the accompanying drawings.

DETAILED DESCRIPTION OF THE PREFERRED EMBODIMENTS

Hereafter, with reference to drawings, preferable embodiments of the present invention will be explained in detail. In explanation of drawings, the same sign will be used to show the same portion.

Embodiment 1

Figure 1:
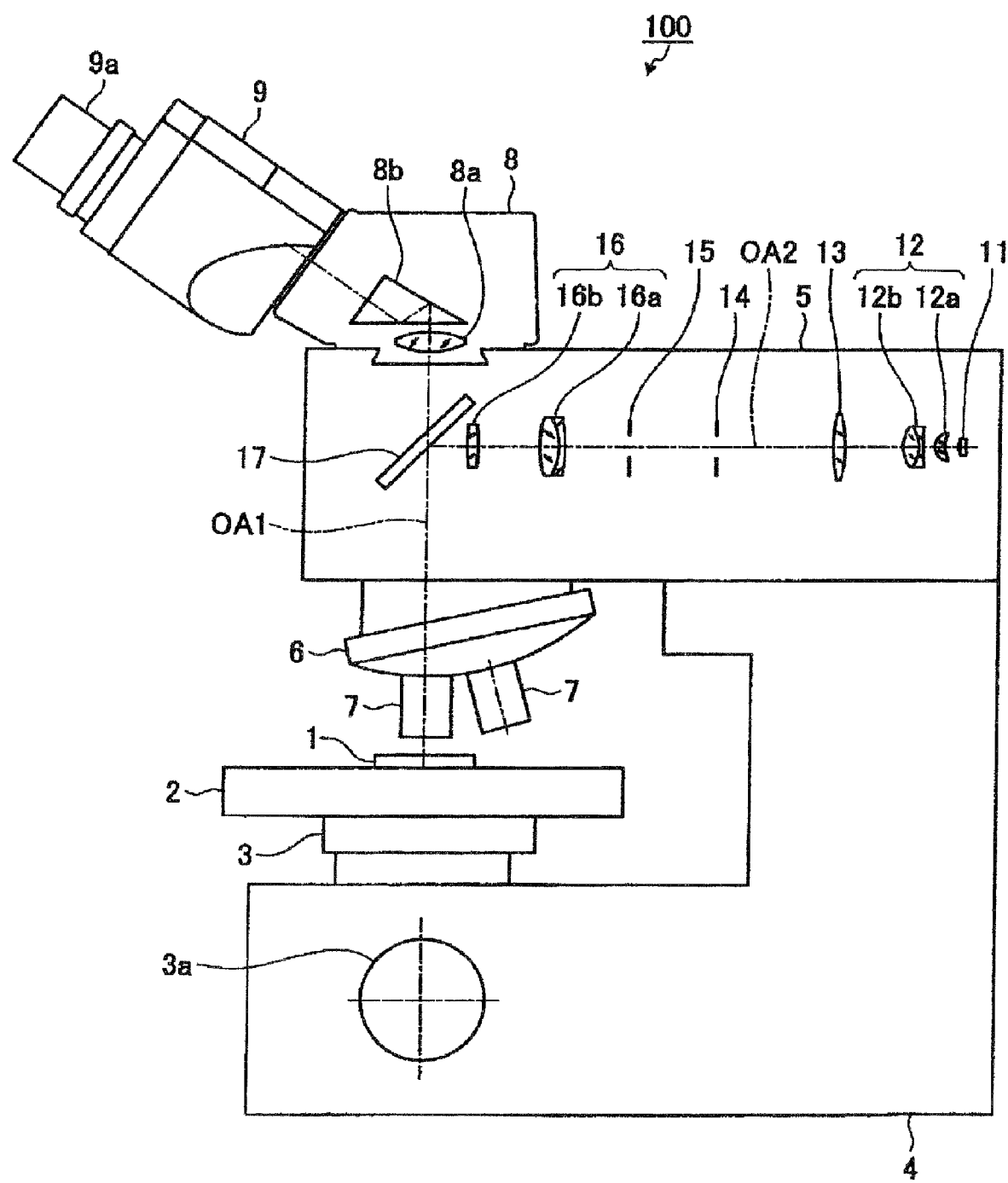
FIG. 1 is a diagram showing the whole constitution of a microscope using an illumination apparatus concerning an embodiment 1 of the present invention.

As shown in FIG. 1, the microscope 100 comprises a stage 2 in which a sample 1 is mounted, a main body of a microscope 4 which supports the stage 2 through a stage holder 3, an illumination apparatus 5 arranged on the main body of the microscope 4, a revolver 6 arranged at front side (left-hand side in FIG. 1) of bottom of the illumination apparatus 5, two or more objective lenses 7 which can be exchanged to the revolver 6 a body tube 8 arranged at an upper part of the illumination apparatus 5 located at just above the revolver 6, and a binocular part 9 arranged at a side of the body tube 8.

The stage holder 3 is moved upward or downward direction by interlocking with rotation operation of a focusing handle 3a projected at the side surface of the main body of the microscope 4. The sample 1 and the stage 2 are moved along the direction of observation optical axis OA1 for focusing, accompanying such upward-and-downward movement of the stage holder 3, and the focusing (adjusting a point or distance for obtaining a sharp image of an observation object) is carried out. Furthermore, the sample 1 and the stage 2 are moved freely on a plane perpendicular to the observation optical axis OA1 by a plane drive mechanism which is not illustrated, and an observation position on the sample 1 is adjusted.

The observation optical axis OA1 is equivalent to the optical axis of the objective lens 7 which is arranged selectively by the revolver 6 on the sample 1.

The objective lens 7 is used for image forming of the observation image of the sample 1 illuminated by the illumination apparatus 5 as explained later, in collaboration with an image forming lens 8a arranged inside of the body tube 8. In that case, the objective lens 7 is used for making the observation light emanated from each point on the sample 1 parallel luminous flux, and for transmitting it to an image forming lens 8a.

The image forming lens 8a is used for image forming of the observation image by condensing the observation light emanated from the object lens 7. This observation image is introduced into the binocular part 9 through a polarization prism 8b which is arranged inside of the body tube 8. After it is divided into two namely, in the right and the left directions (perpendicular to this paper surface in FIG. 1) by the binocular part 9, it is visually observed by an observation person etc., through a pair of eyepieces 9a arranged at a top portion of the binocular part 9.

Next, the illumination apparatus 5 which is the principal part of the illumination apparatus concerning the embodiment 1 will be explained in detail. A shown in FIG. 1, the illumination apparatus 5 is provided with LED 11 as a light source which emits illumination light, a collector lens 12 as a condenser in which the illumination light emitted from LED 11 is made parallel light and emitted, and an image forming lens 13 in which an image of the primary light source image which is a conjugate image of LED 11 is formed by condensing the illumination light emanated from the collector lens 12. The collector lens 12 is constituted using the first lens 12a and the second lens 12b.

Further, the illumination apparatus 5 has an aperture stop 14 which restricts the size of the primary light source image which is formed by the image forming lens 13, a field stop 15 which restricts the diameter of luminous flux of the illumination light which passed through the aperture stop 14, a relay lens system 16 in which the illumination light which passed the field stop 15 is condensed, and an image of the secondary light source which is a conjugate image of the primary light source is formed, and a half mirror 17 which deflects the illumination light emanated from the relay lens system 16 toward the objective lens 7 along with the observation optical axis OA1. The relay lens system 16 is constituted using the first relay lens system 16a and the second relay lens system 16b. Here, each of optical elements from LED 11 to the half mirror 17 is arranged along the illumination light axis OA2 as a common optical axis.

The aperture stop 14 is arranged at the conjugate position to the pupil of the objective lens 7, wherein by restricting the size of the primary light source image, a numerical aperture (NA) of the illumination light for irradiating the sample 1 is specified. The field stop 15 is arranged at the conjugate position to the sample 1 at the focal position of the objective lens 7, wherein by restricting the diameter of luminous flux of the illumination light which passed the aperture stop 14, the irradiation scope of the illumination light for irradiating the sample 1 is specified. The relay optical system 16 is constituted such that an image of the secondary light source is formed on the pupil of the objective lens optically connected to the illumination apparatus. Thus, in the illumination apparatus 5 Koehler illumination is carried out to the sample 1 through the objective lens 7. Here, as for the relay lens system 16, it does not need to carry out image forming of the secondary light source on the pupil of the objective lens 7 strictly and what is necessary is just to carry out the image forming of it near the pupil.

Figure 2:
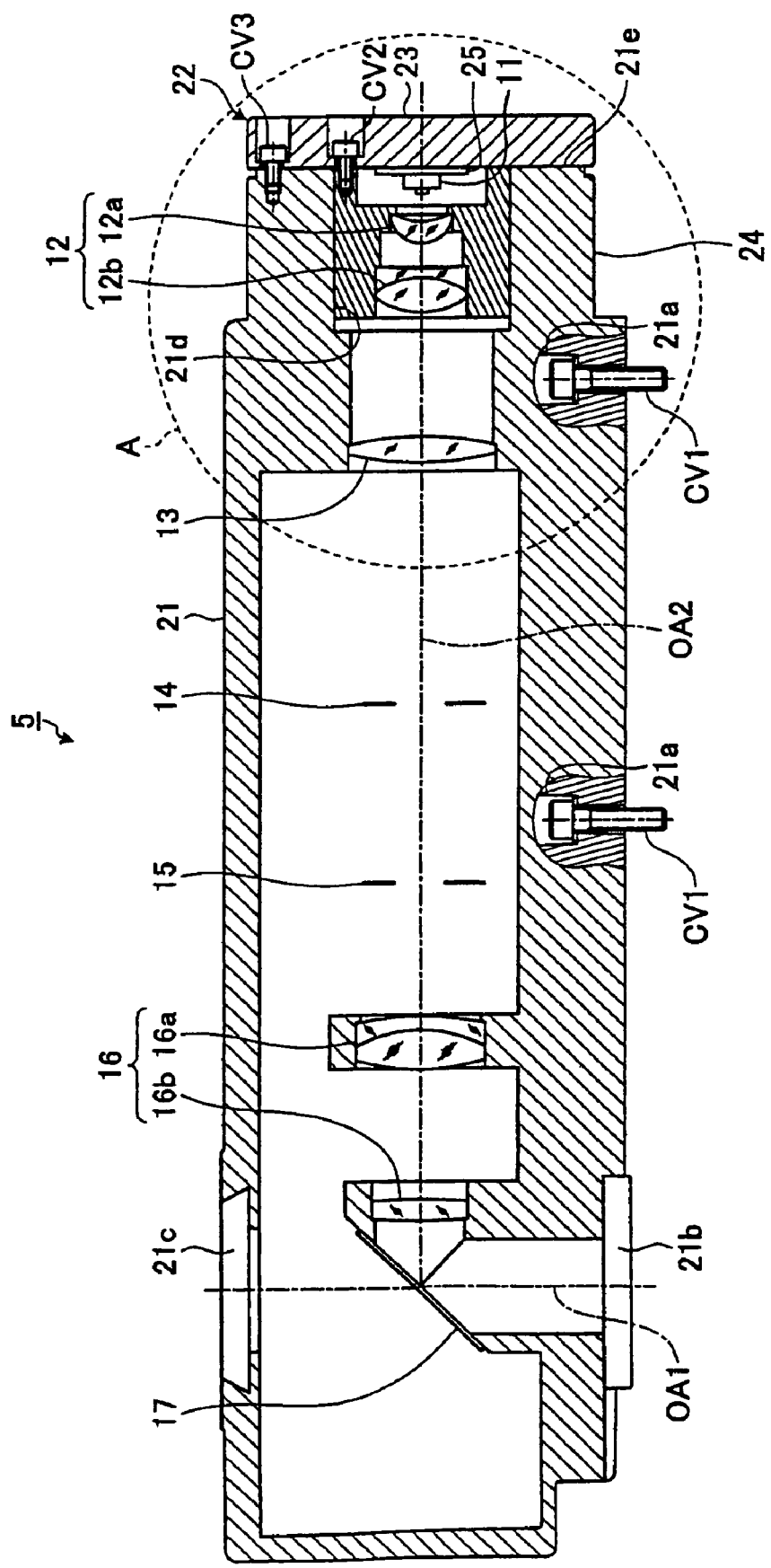
FIG. 2 is a sectional view showing a constitution of the illumination apparatus of the embodiment 1 according to the present invention.
Figure 3:
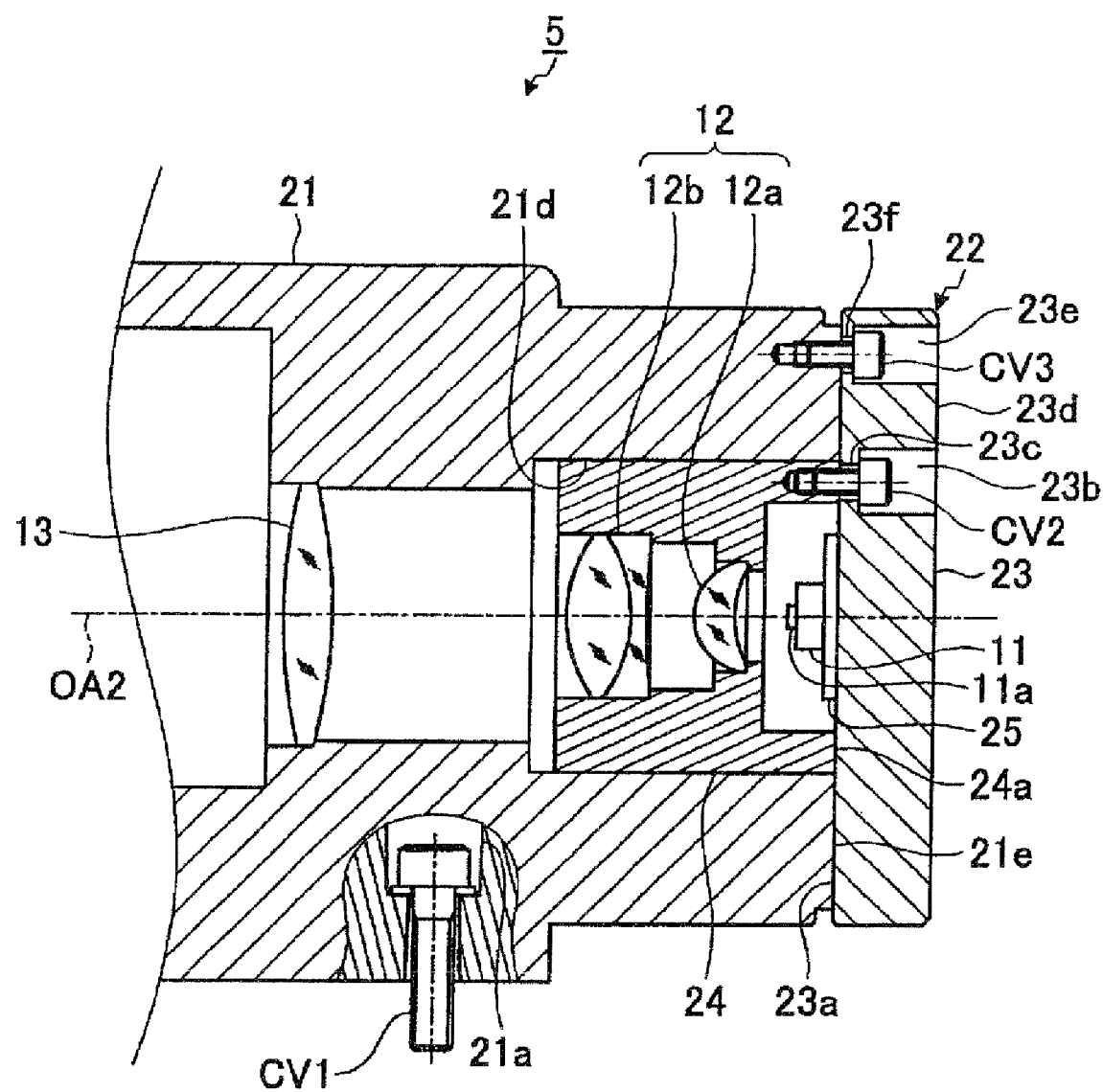
FIG. 3 is a partially enlarged sectional view showing a constitution of the illumination apparatus of the embodiment 1 according to the present invention.

FIGS. 2 and 3 are sectional views showing a constitution of the illumination apparatus 5, FIG. 2 shows the whole constitution of the illumination apparatus 5.

FIG. 3 shows an enlarged constitution of A domain shown in FIG. 2. As shown in these figures, each of optical elements, which is equipped in the illumination apparatus 5 is arranged in the main body 21 of an illuminator. On the main body 21 of the illuminator, two or more spot facing holes 21a are formed at the bottom, and it is installed by screws on the main body 4 of the microscope at the every spot facing hole 21a by using a clamp screw CV1.

Further, as for the main body 21 of the illuminator, openings 21b and 21c are formed respectively at a bottom part and an upper surface part which are located on the observation optical as OA1 when the main body 21 is mounted on the main body 4 of the microscope. Thus, the illumination light path and observation light path to the sample 1 are secured. Furthermore, on the peripheral part of the opening 21b, a dovetail groove for fixing a revolver 6 so that it may be attached and detached freely is arranged. On the peripheral part of the opening 21c, a dovetail groove for fixing the revolver 6 so that it may be attached and detached freely is arranged.

Further, on the main body 21 of the illuminator, at a rear end part (the right end part in FIGS. 2 and 3), a connection hole 21d by which the inside of the main body 21 of the illuminator connects communicatively to the outside is formed along the illumination light axis OA2 as a center axis. At the inner side end (the left hand side end in FIGS. 2 and 3)

of the connection hole 21*d*, the image forming lens 13 is arranged so as to be fitted into it. At an outer side end part (the right end part in FIGS. 2 and 3), the light source unit 22 is arranged so as to be fitted into it. The light source unit 22 is constituted using a heat dissipation plate 23 for holding LED 11, which emits the heat emanated from LED 11, and a lens holding frame 24 for holding the collector lens 12, which holds the heat dissipation plate 23 so that a relative position of the LED 11 to the collector lens may be changed.

Concretely, the heat dissipation plate 23 holds LED 11 through a substrate 25, and effuses heat emanated from the luminescence part 11*a* of LED 11 and is transmitted through the substrate 25, to outside from the back part (the right-hand side part in FIGS. 2 and 3) of LED 11. Further, the heat dissipation plate 23 effuses a part of the heat transmitted from the substrate 25 by transferring the heat to the main body 21 of the illuminator 21 and the lens frame 24 which are connected as explained later. The heat dissipation plate 23 and the substrate 25 are formed using materials having high heat conductivity such as aluminum and the like, and furthermore, surfaces of these are mutually stuck firmly. Thus, the conductivity efficiency of heat can be raised.

Thus, in the light source unit 22, the heat emanated from the luminescence part 11*a* can be effused to outside of LED 11, and the rise of the heat of the luminescence part 11*a* can be controlled, and accordingly the life of LED 11 can be improved. As for LED, it is generally known that the heat generated by LED is small as compared with that of the lamp light source, such as a halogen lamp, and the like, but its life time is shortened since degradation of the luminescence part is promoted by the heat generated by itself. On the other hand, in the light source unit 22, since the heat emitted by LED 11 can always be emitted by the heat dissipation plate 23, degradation of the luminescence part 11*a* can be controlled and the life time of LED 11 can be extended. The back part to LED 11 of the heat dissipation plate 23 can be formed a lib shape or a heat dissipation fin. Thus, external surface area of the heat dissipation plate 23 can be enlarged, and the heat dissipation effect by the heat dissipation plate 23 can be raised further.

The lens frame 24 is fabricated in a cylindrical shape having an inside diameter which changes with a position, and holds the first lens 12*a* and the second lens 12*b* which constitute the collector lens 12, at a predetermined interval along the direction of the illumination light axis OA2. The first lens 12*a* and the second lens 12*b* are fixed on the lens frame 24 by being fitted into it, respectively. Furthermore, the lens frame 24 has an end face 24*a* perpendicular to the illumination light axis OA2, and a clamp face 23*a* of LED 11 in the heat dissipation plate 23 is touched to this end face 24*a*. Thus, the lens frame 24 holds LED 11 to the collector lens 12 on a predetermined position 12 along the direction of the illumination light axis OA2, for example, on the focal plane of the collector lens. Here, "the end face 24*a* is perpendicular to the illumination light axis OA2" is not limited strictly, but, it includes a case that the end face 24*a* is nearly perpendicular to the illumination light axis OA2.

Here, the spot facing hole 23*b* is formed at a position where the heat dissipation plate 23 is faced to the end face 24*a*, and the heat dissipation plate 23 is mounted on the lens frame 24 by a clamp screw CV2 inserted through the spot facing hole 23*b*. On the spot facing hole 23*b*, a predetermined amount of gap 23*c* is formed between a thread part of clamp screw CV2, and an inside wall of the Spot facing hole 23*b*. Therefore, in the state where the clamp screw GV2 is inserted into the spot facing hole 23*b*, the heat dissipation plate 23 can slide to the end face 24*a* within a limit of the gap 23*c*. That is, in a state that the heat dissipation plate 23 is not completely fixed by the clamp screw CV2, a relative position to the lens frame 24 can be changed in a plane perpendicular to the illumination light axis OA2. By such constitution, the lens frame 24 holds the heat dissipation plate 23 so that the relative position of LED 11 to the collector lens 12 may be changed in the plane perpendicular to the illumination light axis OA2.

In the light source unit 22, by such constitution that the relative position of LED 11 to the collector lens 12 can be changed in such way as mentioned above, alignment adjustment (eccentricity correction) of LED 11 to the collector lens 12 can be done simply. This alignment adjustment can be carried out individually by every light source unit 22, before attaching the light source unit 22 to the main body of an illuminator. Accordingly, when exchanging LED 11 in the lighting system 5, LED 11 can be exchanged easily and quickly by exchanging for other light source units 22 for which the alignment adjustment has been carried out beforehand without carrying out the alignment adjustment on the main body 21 of the illuminator.

Generally, in LED, there is individual specificity (variation) with respect to the position of a luminescence part. Accordingly, when LED is exchanged, the alignment adjustment of LED to the collector lens is required. And when LED is exchanged while fixing the collector lens on the main body 21 of the illuminator, it is necessary to carry out the alignment adjustment of LED on the main body 21 of the illuminator. Contrary to this mentioned above, in the light source unit 22, alignment adjustment can be carried out every light source unit 22, independently from the main body 21 of the illuminator. Accordingly, for example, by only exchanging for other light source unit 22 of which the alignment adjustment has been carried out beforehand, LED 11 can be exchanged immediately, and it can return to a state that alignment adjustment has been carried out.

The heat dissipation plate 23 is formed in a disc shape having a larger outside diameter than the outside diameter of the end face 24*a* of the lens frame 24, and the peripheral part is mounted by screw on the end face 24*a* in a state that it overhangs out of the end face 24*a*. Accordingly, the light source unit 22 is held on at the main body 21 of the illuminator, wherein the lens frame 24 is fitted into the communicative connection hole 21*d* by being inserted, and the extended portion 23*d* which is overhung from the end face 24*a* in the heat dissipation plate 23 touches a circumference portion 21*e* of a communicative connection hole 21*d* at the back end side of the main body 21 of the illuminator. Thus, the light source unit 22 is positioned to the main body 21 of the illuminator in the direction of the illumination light axis OA2 and the direction perpendicular to the illumination light axis OA2, and is held.

On the extended portion 23*d*, a spot facing hole 23*e* is formed at a position which faces the circumference portion 21*e*, and the extended portion 23*d* is fixed by screws on the circumference portion 21*e* by using a clamp screw CV3 which is inserted through the spot facing hole 23*e*. In the spot facing hole 23*e*, a clearance 23*f* is arranged between a thread part of the clamp screw CV3 and the inside wall of the spot facing hole 23*e*, and the size of the clearance 23*f* is made more than the clearance 23*c* in the spot facing hole 23*b*. By such constitution mentioned above, the extended portion 23*d* is mounted on the circumference portion 21*e* by screws, without restricting an adjustable range of the relative position to the lens frame 24 smaller than the clearance 23*c*, and the light source unit 22 can be stably held with the main body 21 of the illuminator.

As explained above, the illumination apparatus 5 concerning the embodiment 1, comprises the light source unit 22 which has LED 11 as a light source for emitting illumination light, and the collector lens 12 as a condenser lens for collecting illumination light, and the main body 21 of the illuminator of the apparatus which holds the light source unit 22 and guides the illumination light. The light source unit 22 has the heat dissipation plate 23 for holding LED 11, which emits the heat emanated from LED 11, and the lens holding frame 24 for holding the collector lens 12, which holds the heat dissipation plate 23 so that a relative position of the LED 11 to the collector lens may be changed. The main body 21 of the illuminator has the connection hole 21d for connecting communicatively the inside of the main body 21 of the apparatus to outside, and the light source unit 22 is held by inserting the lens frame 24 into the connection hole 21d.

By such constitution, in the illumination apparatus 5, downsizing of the whole apparatus can be promoted, and mostly whole of the light source unit 22 can be arranged in the main body 21 of the illuminator, and thus, a space for mounting can be made small or space-saving. Furthermore, by suppressing degradation of the LED 11 by generation of heat, the life time of LED 11 can be extended, and the adjustment of a relative position of LED 11 to the condenser lens 12 can be carried out.

Modified Example

Figure 4:
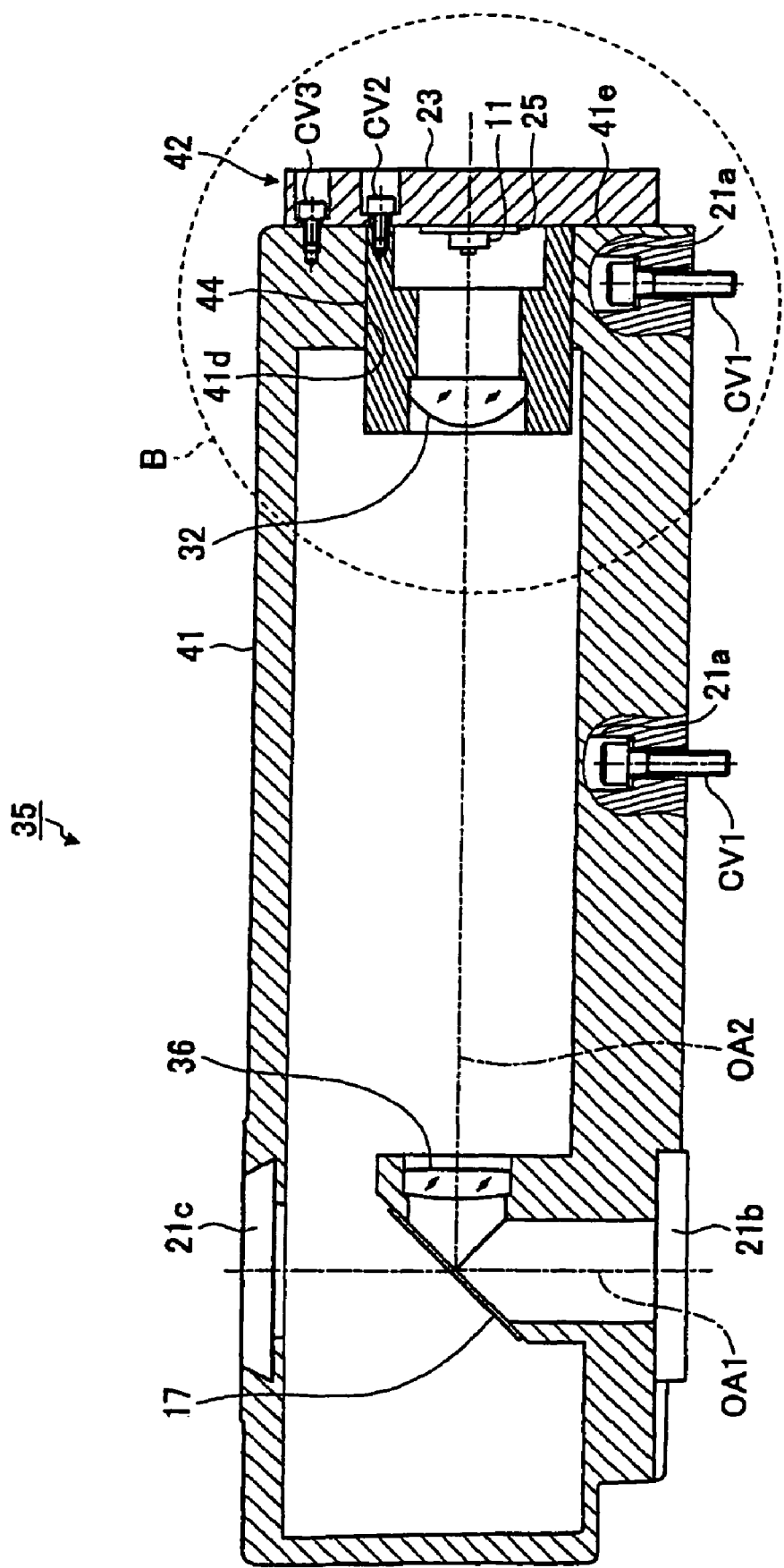
FIG. 4 is a sectional view showing the constitution of the illumination apparatus concerning a modified example of the embodiment 1.
Figure 5:
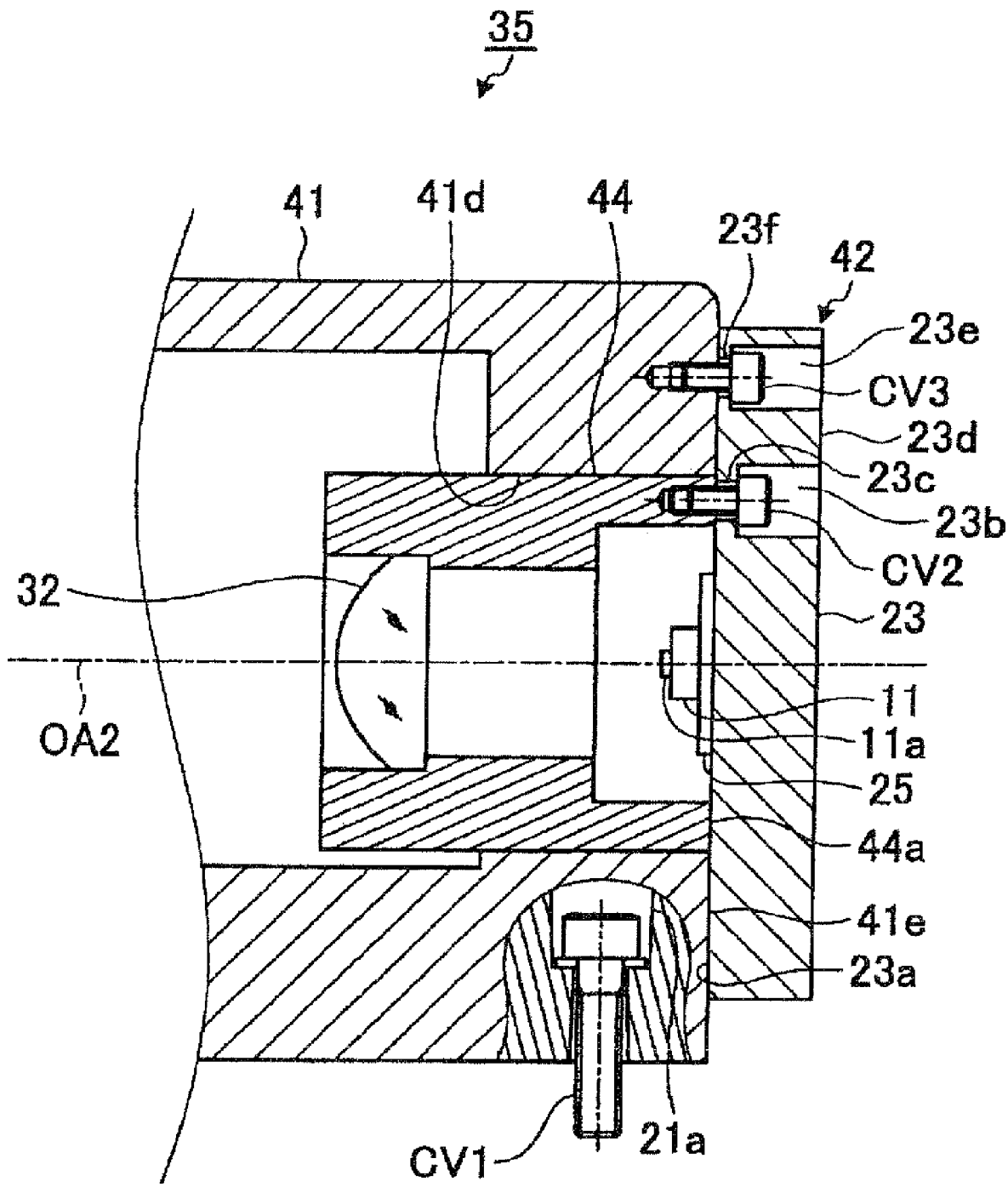
FIG. 5 is a partially enlarged sectional view showing a constitution of the illumination apparatus concerning the modified example of the embodiment 1.

Next, an modified example of the illumination apparatus concerning the present embodiment 1 will be explained FIGS. 4 and 5 are sectional views showing a constitution of an illumination apparatus 35 which is a principal part of the illumination apparatus concerning the present modified example. FIG. 4 shows the whole constitution of the illumination apparatus 35. FIG. 5 shows an enlarged constitution of B domain shown in FIG. 4. The illumination apparatus 35 is mounted on a microscope 100 so that it may be replaced by the illumination apparatus 5 mentioned above. As shown in FIGS. 4 and 5, the illumination apparatus 35 is constituted on a basis of constitution of the illumination apparatus 5, and has the main body 41 of an illuminator and a light source unit 42 in place of the main body 21 of the illuminator and the light source unit 22. Moreover, it has a collector lens 32 and an image forming lens 36 in place of the illumination optical system which is arranged at the main body 21 of the illuminator, including such as the collector lens 12, the image forming lens 13, the aperture stop 14, the field stop 15, and the relay lens system 16, The collector lens 32 and the image forming lens 36 are arranged in the main body 41 of an illuminator along the illumination light axis OA2 as a common optical axis. Other constitutions are the same as the illumination apparatus 5. In explanation of drawings, the same sign will be used to show the same portion.

The collector lens 32, makes the illumination light emanated from LED 11 into parallel light, and emits it. The image forming lens 36 is used for image forming of the light source image which is a conjugate image of LED 11 by condensing the illumination light emanated from the collector lens 32. The image forming lens 36 forms the image of the light source of LED 11 via the half mirror 17 on the pupil of the objective lens 7 optically connected to the illumination apparatus 35. Thus, in the illumination apparatus 35, an incidence illumination is carried out to the sample 1 through the objective lens 7. Here, as for the relay lens system 36, it does not need to carry out image forming of the light source image on the pupil of the objective lens 7 strictly, and what is necessary is just to carry out the image forming near the pupil.

On the main body 41 of the illuminator, at a rear end part (the right end part in FIGS. 4 and 5), a connection hole 41d by which the inside of the main body 41 of the illuminator connects communicatively outside is formed along the illumination light axis OA2 as a center axis. The light source unit 42 is fitted into the connection hole 41d. The light source unit 42 has the lens frame 44 in place of the lens frame 24 on a basis of the light source unit 22. The lens frame 44 holds the collector lens 32, and further, the heat dissipation plate 23 so that the relative position of LED 11 to the collector lens 32 may be changed. The lens frame 44 has the end surface 44a perpendicular to illumination light axis OA2, wherein the heat dissipation plate 23 touches this end surface 44a, and the heat dissipation plate 23 is held like the lens frame 24 in the light source unit 22. The heat dissipation plate 23, as same to the case of the light source unit 22, the extended portion 23d touches the circumference portion 41e of the connection hole 41d in the rear end side of the main body 41 of the illuminator by using screw bolts. The collector lens 32 is fixed on the lens frame by being fitted into it.

The illumination apparatus 35 concerning the present modified example explained above, the same effect as the illumination apparatus 5. Namely, in the illumination apparatus 35 downsizing of the whole apparatus can be promoted, and most of the whole of the light source unit 42 can be arranged in the main body 41 of the illuminator, and thus a space for mounting can be made small or space-saving. Furthermore, by suppressing degradation of the LED 11 by generation of heat, the life time of LED 11 can be extended, and further an adjustment of a relative position of LED 11 to the collector lens 32 can be carried out.

Embodiment 2

Figure 6:
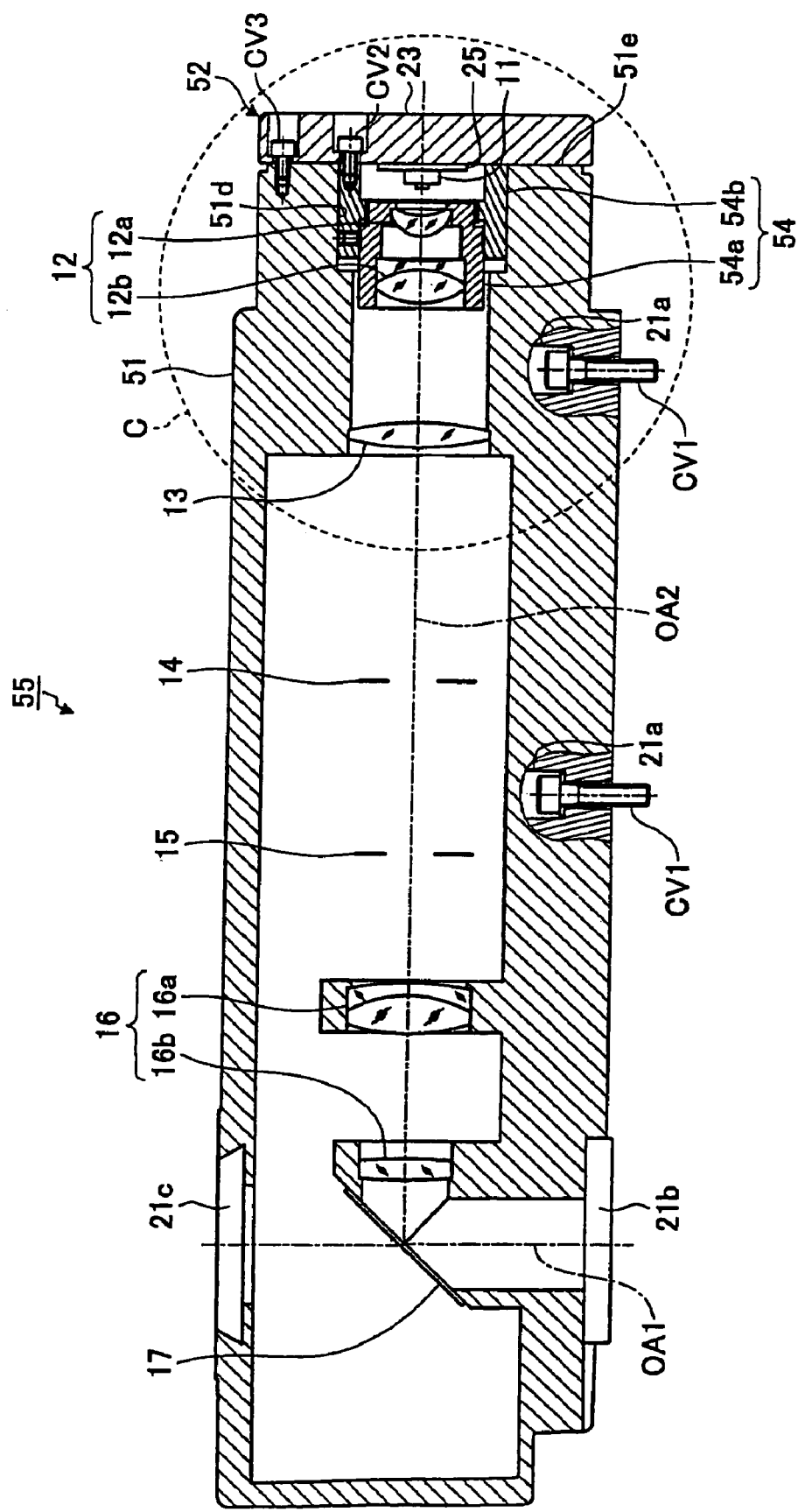
FIG. 6 is a sectional view showing a constitution of an illumination apparatus concerning an embodiment 2.
Figure 7:
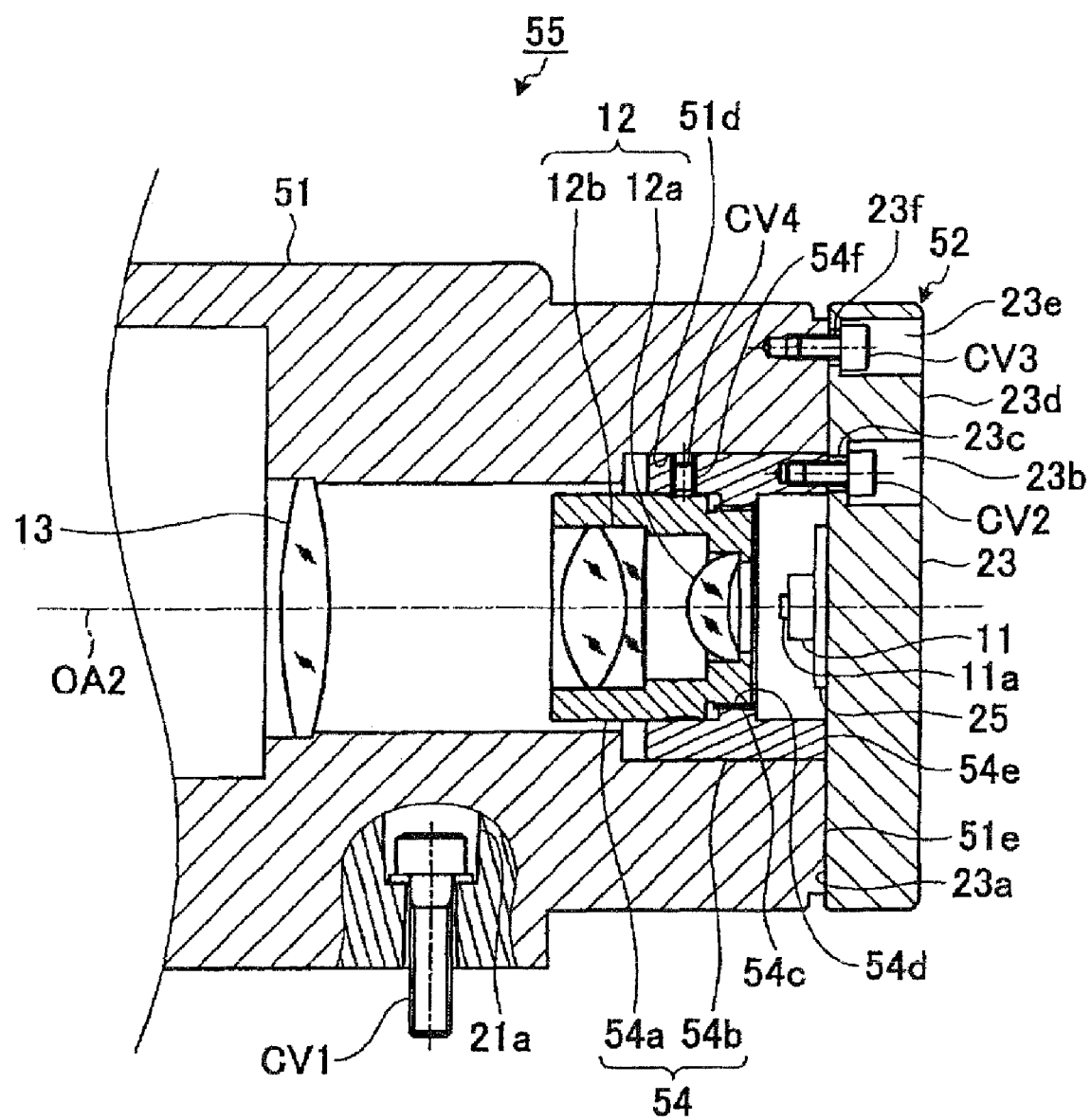
FIG. 7 is an partially enlarged sectional view showing the constitution of the illumination apparatus of the embodiment 2.

Next, an illumination apparatus concerning the embodiment 2 of the present invention will be explained. In the light source units 22 and 42 mentioned above, each of the lens holders 24 and 44 are used for holding the heat dissipation plate 23 so that a relative position of LED 11 to the collector lenses 12 and 32 may be changed in a plane perpendicular to the illumination light axis OA2. However, in the present embodiment 2, the heat dissipation plate 23 is held so that the relative position of LED 11 may be changed further toward the direction of the illumination light axis OA2 FIGS. 6 and 7 are sectional views showing a constitution of an illumination apparatus 55 which is a principal part of the illumination apparatus concerning the present embodiment 2. FIG. 6 shows the whole constitution of the illumination apparatus 55. FIG. 7 shows an enlarged constitution of the domain C shown in FIG. 6. The illumination apparatus 55 is mounted on a microscope 100 so that it may be replaced by the illumination apparatuses 5 and 35 mentioned above. As shown in FIGS. 6 and 7, the illumination apparatus 55 has a main body 51 of an illuminator and a light source unit 52 in place of the main body 21 of the illuminator and the light source unit 22 on a basis of constitution of the illumination apparatus 5. On the main body 51 of the illuminator, as same to the main body 41 of the illuminator, at a rear end part (the right end part in FIGS. 6 and 7), a connection hole 51d by which the inside of the main body 51 of the illuminator connects communicatively outside is formed along the illumination light axis OA2 as a center axis, and the light source unit 22 is fitted into connection hole 51d. The light source unit 52 has a lens frame 54 in place of the lens frame 24 on a basis of the constitution of the light source unit 22. The lens frame 54 is constituted using the first lens frame 54a and the second lens frame 54b, wherein it holds the collector lens 12, and the heat dissipation plate 23 so that a relative position of the LED11 to the collector lens 12 may be changed.

Concretely, the first lens frame 54*a* and the 2nd lens frame 54*b* are formed cylindrical shape, respectively. On the outside circumference of the rear end of the first lens frame 54*a*, and an inner circumference portion of the central part of the second lens frame 54*b*, thread parts 54*c* and 54*d* are formed, respectively. The first lens frame 54*a* holds, in its inside, the first lens 12*a* and the second lens 12*b* at a predetermined intervals of in the direction of the illumination light axis OA2, and its rear end part is fitted into the 2nd lens frame 54*b*, and it is fixed by screws with the thread parts 54*c* and 54*d*. The second lens frame 54*b* has an end surface 54*e* perpendicular to the illumination light axis OA2, wherein the heat dissipation plate 23 touches to this end surface 54*e*, and the heat dissipation plate 23 is held by the lens frame 54*b* like the lens frame 24 in the light source unit 22. Accordingly in the lens frame 54, by screwing the first lens frame 54*a* into, or out the second lens frame 54*b*, a relative position of the heat dissipation plate 23 to the collector lens 12 can be changed toward the optical axis of the collector lens 12, namely, toward the direction of the illumination light axis OA2. Accordingly, the relative position of LED 11 to the condenser lens 12 can be changed toward the illumination-light axis OA2. By such constitution as mentioned above, in the light source unit 52 positioning of the luminescence part 11*a* of LED11 can be adjusted easily at a desired position such as a focal plane of the collector lens 12 and the like. After positioning of the luminescence part 11*a* of LED11 is adjusted at a desired position such as a focal plane of the collector lens 12 and the like, the first lens frame 54*a* is fixed to the second lens frame 54*b* by the clamp screw CV4 screwed into screw holes formed at inside surface of the second lens frame 54*b*. The heat dissipation plate 23 is fixed as same to the case of the light source unit 22, wherein its extended portion 23*d* touches the circumference portion 51*e* of the connection hole 51*d* in the rear end side of the main body 51 of the illuminator by using screw bolts.

The illumination apparatus 55 concerning the present embodiment 2 explained above has the same effect as the illumination apparatus 5. Namely, in the illumination apparatus 55 downsizing of the whole apparatus can be promoted, and most of the whole of the light source unit 22 can be arranged in the main body 21 of the illuminator, and thus a space for mounting can be made small or space-saving. Furthermore, by suppressing degradation of the LED11 by generation of heat, the adjustment of a relative position of LED 11 to the condenser lens 12 can be carried out. Further, in the illumination apparatus 55, since the relative position of the illumination light axis OA2 of LED 11 to the condenser lens 12 can be adjusted, positioning of the illumination light axis OA2 of the luminescence part 11*a* toward the direction of the collector lens 12 can be carried out more strictly than the case of the illumination apparatus 5, and an image of the secondary light source image can be formed on the pupil of the objective lens 7 more correctly than the case of the illumination apparatus 5. By such constitution mentioned above, Koehler illumination can be carried out always well to the sample 1 without being influenced by variations of the position of the objective lens 7 or the luminescence part 11*a*.

Modified Example 1

Next, a modified example 1 of the illumination apparatus concerning the present embodiment 2 will be explained.

Figure 8:
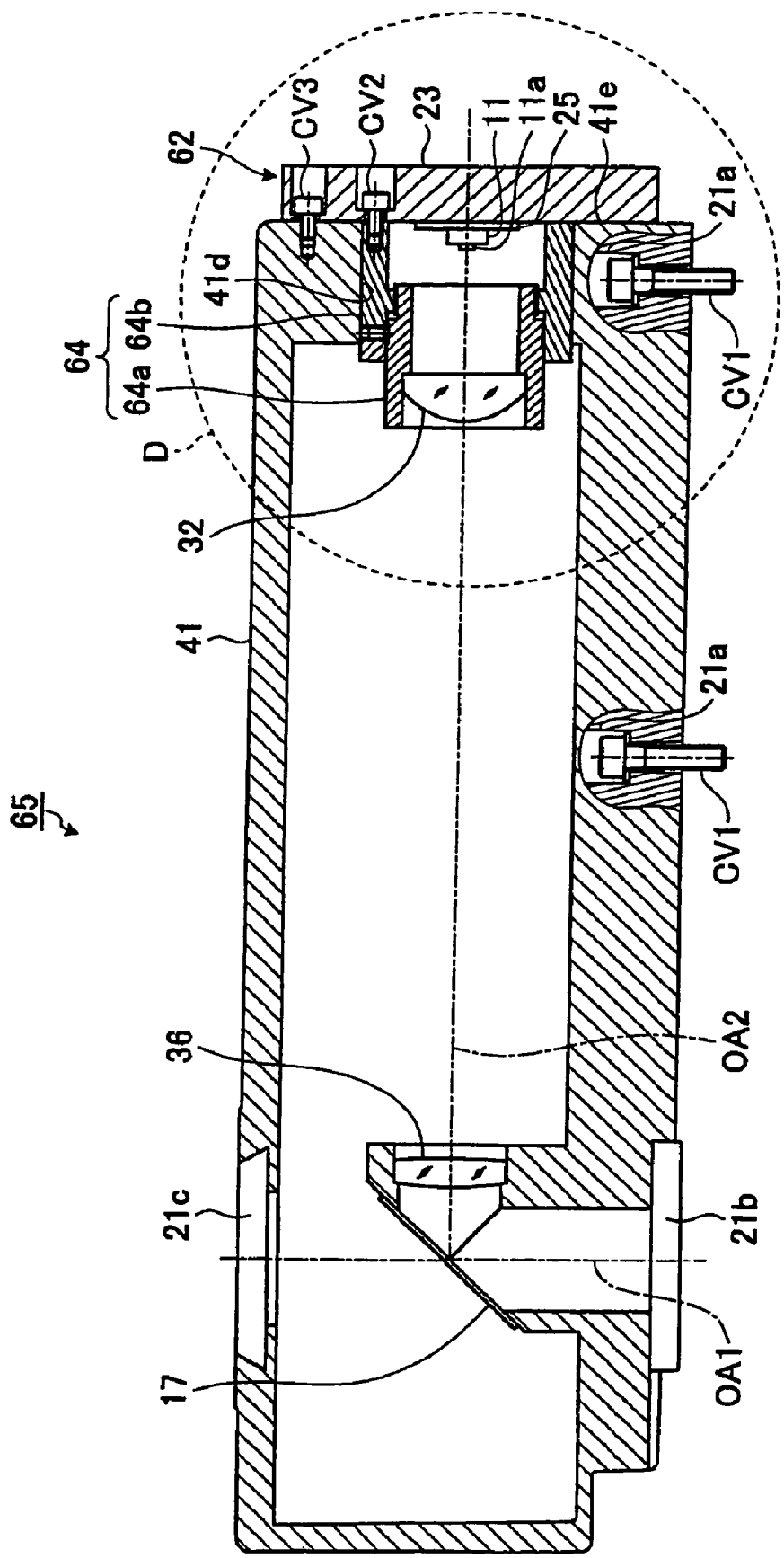
FIG. 8 is a sectional view showing the constitution of the illumination apparatus concerning a modified example 1 of the embodiment 2.
Figure 9:
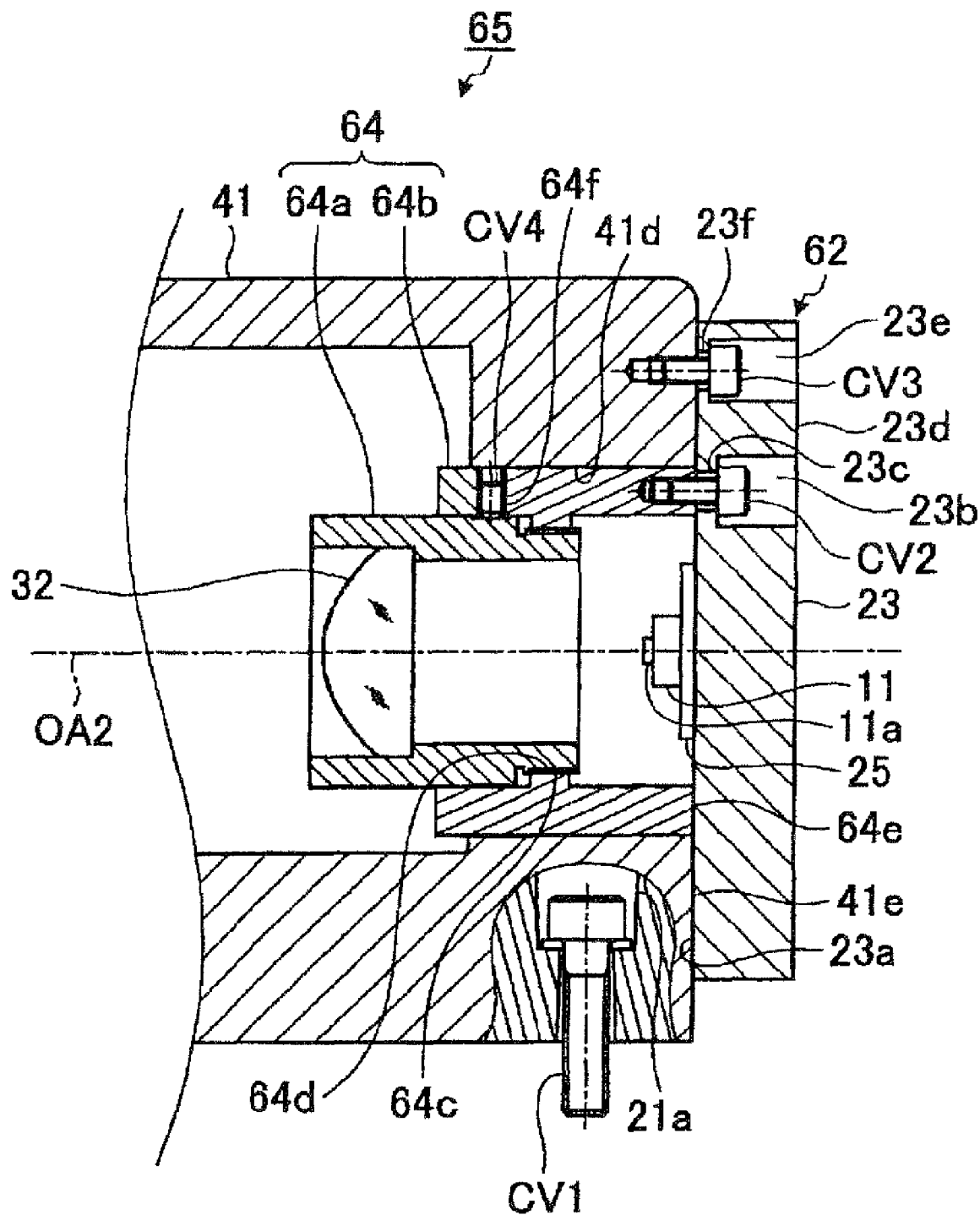
FIG. 9 is a partially enlarged sectional view showing the constitution of the illumination apparatus concerning the modified example 1 of the embodiment 2.

FIGS. 8 and 9 are sectional views showing a constitution of an illumination apparatus 65 which is a principal part of the illumination apparatus concerning the present modified example. FIG. 8 shows the whole constitution of the illumination apparatus 65. FIG. 9 shows an enlarged constitution of D domain shown in FIG. 8. The illumination apparatus 65 is mounted on a microscope 100 so that it may be replaced by the illumination apparatuses 5, 35, and 55 mentioned above. As shown in FIGS. 8 and 9, the illumination apparatus 55 has a light source unit 62 in place of the light source unit 42 on a basis of constitution of the illumination apparatus 35. The light source unit 62 has a lens frame 64 in place of the lens frame 42 on a basis of the constitution of the light source unit 42, and is fitted into the connection hole 41*d*. The lens frame 64 is constituted using the first lens frame 64*a* and the second lens frame 64*b*, wherein it holds the collector lens 32, and the heat dissipation plate 23 so that a relative position of the LED11 to the collector lens 32 may be changed.

Concretely, the first lens frame 64*a* and the 2nd lens frame 64*b* are formed cylindrical shape, respectively. On the outside circumference of the rear end of the first lens frame 64*a*, and an inner circumference portion of the central part of the 2nd lens frame 64*b*, thread parts 64*c* and 64*d* are formed, respectively. The first lens frame 64*a* holds the collector lens 32 in its inside, and its rear end part is fitted into the 2nd lens frame 64*b*, and it is fixed by screws with the thread parts 64*c* and 64*d*. The second lens frame 64*b* has the end surface 64*e* perpendicular to the illumination light axis OA2, and the heat dissipation plate 23 touches to the end surface 64*e*, and it holds the heat dissipation plate 23 like the lens frame 44 in the light source unit 42.

Accordingly, in the lens frame 64, by screwing the first lens frame 64*a* into the second lens frame 54*b* or pulling out from it, a relative position of the heat dissipation plate 23 to the collector lens 32 can be changed toward the optical axis of the collector lens 32, namely, toward the direction of the illumination light axis OA2. Therefore, the relative position of LED 11 to the condenser lens 32 can be changed toward the illumination-light axis OA2. By such constitution mentioned above, in the light source unit 62 positioning of the luminescence part 11*a* of LED 11 can be adjusted easily at a desired position such as a focal plane of the collector lens 32 and the like.

After positioning of the luminescence part 11*a* of LED 11 is adjusted at a desired position such as a focal plane of the collector lens 32 and the like, the first lens frame 64*a* is fixed to the second lens frame 64*b* by the clamp screw CV4 screwed into screw holes formed at side surface of the second lens frame 64*b*. The heat dissipation plate 23 is fixed by touching the extended portion 23*d* the circumference portion 41*e* of the connection hole 41*d* in the rear end side of the main body 41 of the illuminator by using screw bolts, as same to the case of the light source unit 42.

The illumination apparatus 65 concerning the present modified example 1 explained above has the same effect as that of the illumination apparatus 35. Namely, in the illumination apparatus 65 downsizing of the whole apparatus can be promoted, and most of the whole of the light source unit 62 can be arranged in the main body 41 of the illuminator, and a space for mounting can be made small or space-saving. Furthermore, by suppressing degradation of the LED 11 by generation of heat, the life time of LED 11 can be extended, and an adjustment of a relative position of LED 11 to the collector lens 32 can be carried out. Further, in the illumination apparatus 65 since the relative position of the illumination light axis OA2 of LED 11 to the condenser lens 32 can be adjusted, positioning of the illumination light axis OA2 of the luminescence part 11*a* toward the direction of the collector lens 32 can be carried out more strictly than the case of the illumination apparatus 35, and an image of the secondary light source image can be formed on the pupil of the objective lens 7 more exactly than the case of the illumination apparatus 35. By such constitution mentioned above, a uniform illumination with little unevenness can be carried out always to the sample 1 without being influenced by variations of the position of the objective lens 7 or the luminescence part 11a.

Modified Example 2

Next, a modified example 2 of the illumination apparatus concerning the present embodiment 2 will be explained.

Figure 10:
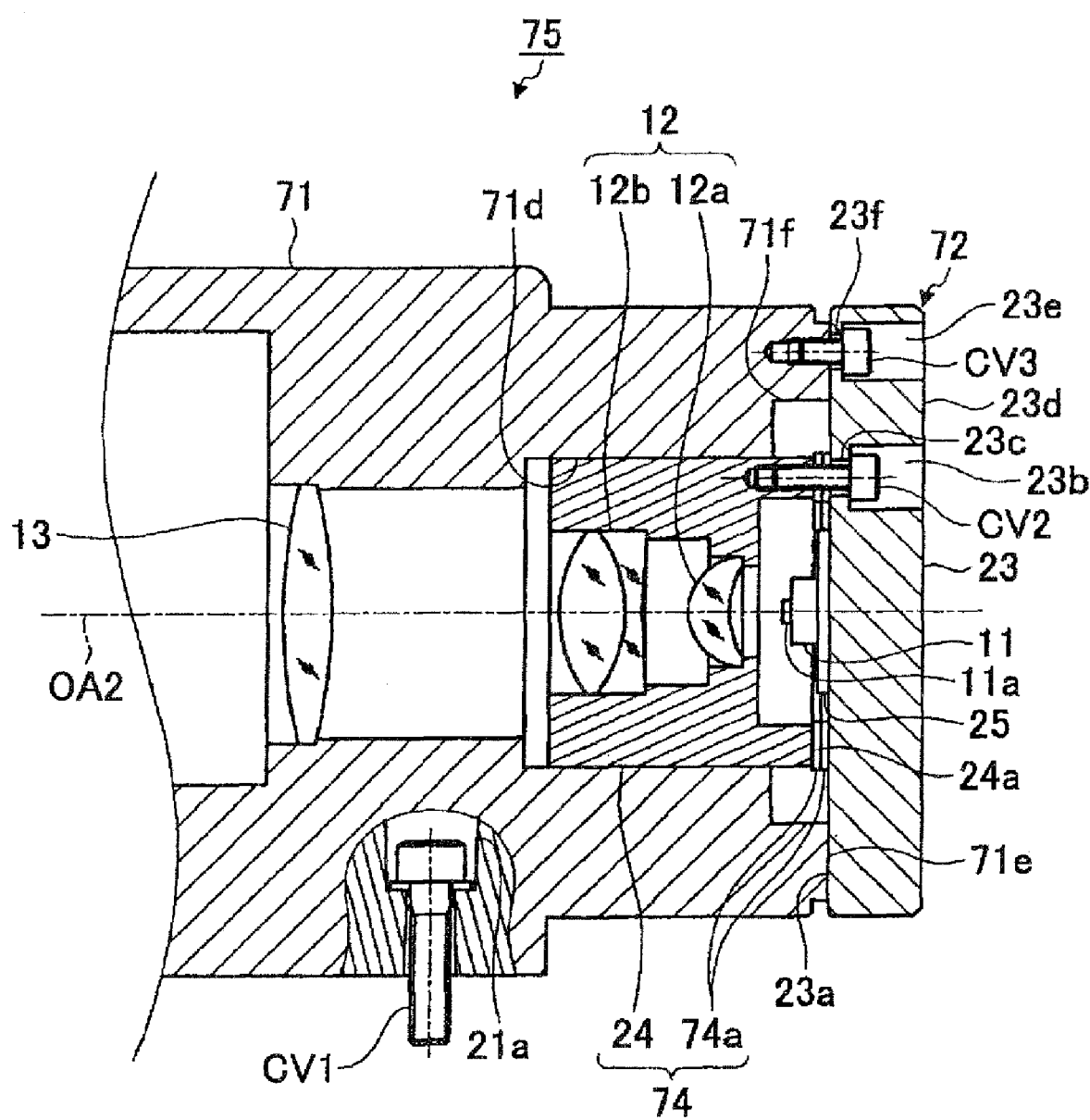
FIG. 10 is a sectional view showing the constitution of the illumination apparatus concerning a modified example 2 of the embodiment 2.

FIG. 10 is a sectional view showing a partial constitution of an illumination apparatus 75 which is a principal part of the illumination apparatus concerning the present modified example 2. The illumination apparatus 75 is mounted on a microscope 100 so that it may be replaced by the illumination apparatuses 5, 35, 55 and 65 mentioned above. As shown in FIG. 10, the illumination apparatus 75 has a main body 71 of an illuminator and a light source unit 72 in place of the main body 21 of the illuminator and the light source unit 22 on a basis of constitution of the illumination apparatus 5. On the main body 71 of the illuminator, as same to the main body 21 of the illuminator, at a rear end part (the right end part in FIG. 10), a connection hole 71d by which the inside of the main body 71 of the illuminator connects communicatively outside is formed along the illumination light axis OA2 as a center axis. The light source unit 72 has the lens frame 74 constituted using the lens frame 24 and one or more washers 74a as an interval adjustment component, and is fitted into the connection hole 71d on a basis of the light source unit 22. The lens frame 74 holds the collector lens 12, and the heat dissipation plate 23 so that a relative position of the LED 11 to the collector lens 12 may be changed.

Concretely, on the lens frame 74, one or more washers 74a which are parallel plates formed in a ring-belt shape are arranged between the end surface 24a of the lens frame 24 and the heat dissipation plate 23, and the heat dissipation plate 23 touches the end surface 74b of a washer 74a facing the heat dissipation plate 23 out of one or more washers 74a. The lens frame 74 holds the heat dissipation plate 23 so that the washer 74a may be attached or detaches, and the heat dissipation plate 23 so that it may slide to the washer 74a by fixing the heat dissipation plate 23 by screws via the washer 74a by the clamp screw CV2 inserted through the spot facing hole 23b.

Therefore, in the lens frame 74, by changing the number of the washer 74a arranged between the end surface 24a of the lens frame 24 and the heat dissipation plate 23, a relative position of the heat dissipation plate 23 to the collector lens 12 can be changed toward the optical axis of the collector lens 12, namely, toward the direction of the illumination light axis OA2, and accordingly, the relative position of LED 11 to the condenser lens 12 can be changed toward the illumination-light axis OA2. By such constitution mentioned above, in the light source unit 72 positioning of the luminescence part 11a of LED 11 can be adjusted easily at a desired position such as a focal plane of the collector lens 12 and the like. In the light source unit 72, alignment adjustment of LED 11 can be carried out simply by moving the relative position of the heat dissipation plate 23 to the collector lens 12 namely, the relative position of LED 11 on a plane perpendicular to the illumination-light axis OA2, as same to the case of the light source unit 22.

After positioning of LED11 is adjusted at a desired position, the heat dissipation plate 23 and washer 74a are fixed by clamp screw CV2 to the lens frame 24. The heat dissipation plate 23 is fixed by touching the extended portion 23d the circumference portion 71e of the connection hole 71d in the rear end side of the main body 71 of the illuminator by using screw bolts, as same to the case of the light source unit 22. Here, at the perimeter of the connection hole 71d in the rear end part of the main body 71 of an illuminator, a gap 71f is arranged in order to avoid contact with the washer 74a and the main body 71 of an illuminator, when the light source unit 72 is fitted into it. The illumination apparatus 75 concerning the present modified example 2 explained above has the same effect as the illumination apparatus 5. Namely, in the illumination apparatus 75, downsizing of the whole apparatus can be promoted, and most of the whole of the light source unit 72 can be arranged in the main body 71 of the illuminator, and accordingly, a space for mounting can be made small or space-saving. Furthermore, by suppressing degradation of the LED11 by generation of heat, the life time of LED 11 can be extended, and further the adjustment of a relative position of LED 11 to the condenser lens 12 can be carried out. Furthermore, in the illumination apparatus 75, since the relative position of the illumination light axis OA2 of LED 11 to the condenser lens 12 can be adjusted, positioning of the illumination light axis OA2 of the luminescence part 11a toward the direction of the collector lens 12 can be carried out more strictly than the case of the illumination apparatus 5, and an image of the secondary light source image can be formed on the pupil of the objective lens 7 more correctly than the case of the illumination apparatus 5. By such constitution mentioned above, without being influenced by variations of the position of the objective lens 7 or the luminescence part 11a, Koehler illumination can be carried out always well to the sample 1.

So far, the best modes for carrying out the present invention have been explained as embodiments 1 and 2. However, the present invention is not limited to the embodiments 1 and 2 mentioned above. Various modifications are possible within a scope which does not deviate from the spirit of the present invention. For example, in the embodiments 1 and 2 mentioned above, the heat dissipation plate 23 is fixed by clamp screw CV3 to the main body 21, 41, 51, or 71 of an illuminator, and the light source units 22, 42, 52, 62, and 72 are fixed to the main bodies 21, 41, 51, or 71 of an illuminator. However, it is not limited to fix the heat dissipation plate 23 by screws mentioned above. It may be constituted such that the lens frames 24, 44, 54, 64, and 74 are fixed to the main bodies 21, 41, 51, or 71 of the illuminator. In these cases, for example, screw holes are arranged at the main bodies 21, 41, 51, or 71 of the illuminator to side parts of lens frames 24, 44, 54, 64, and 74, and the lens frames 24, 44, 54, 64, and 74 may be fixed to the screw holes with the clamp screws which are screwed into them. In the embodiments 1 and 2 mentioned above, explanation has been made as the illumination apparatus 5, 35, 55, 65, and 75 carry out a vertical illumination to the sample 1. However, it is not limited to the vertical illumination. Transmitted illumination can be used also. Moreover, the illumination apparatus 5, 35, 55, 65, and 75 have been explained as what are used for the microscope 100. However, it is not limited to the microscope. These can be equipped and used in various kinds of equipments for inspection equipments, such as semiconductor inspection equipment, FPD (Flat Panel Display) inspection equipment, etc.

The present invention is not limited to each embodiment described above, and various modifications and amendments are possible without deviating from the scope of the present invention.

What is claimed is:

1. An illumination apparatus comprising:
    a light source unit which includes a semiconductor light emitting element for emitting illumination light and a collector lens for collecting the illuminating light; and a main body of the apparatus which holds the light source unit and guides the illumination light;

wherein the light source unit comprises:

a heat dissipation component which holds the semiconductor light emitting element and dissipates heat emitted from the semiconductor light emitting element; and a lens frame which holds the collector lens and holds the heat dissipation component in such a manner that a relative position of the semiconductor light emitting element with respect to the collector lens is changeable in a plane perpendicular to an optical axis of the collector lens; and wherein the main body of the apparatus has a connection hole that communicatively connects an inside of the main body of the apparatus to an outside, to hold the light source unit by inserting the lens frame into the connection hole to fit the lens frame into the connection hole.

2. The illumination apparatus according to claim 1, wherein the lens frame holds, at an end portion thereof, the heat dissipation component such that the heat dissipation component forms an overhang that extends beyond at least a part of a circumference of the end portion of the lens frame; and wherein the main body of the apparatus is configured to hold the light source unit with the overhang of the heat dissipation component being brought into contact with a brim portion around the connection hole, when the lens frame is inserted into the connection hole.

3. The illumination apparatus according to claim 2, wherein the main body of the apparatus holds the overhang by screwing into the brim portion of around the connection hole.

4. The illumination apparatus according to claim 1, wherein the lens frame has an end surface perpendicular to the optical axis of the collector lens, and holds the heat dissipation component to be slidable with respect to the end surface.

5. The illumination apparatus according to claim 1, wherein the lens frame has an end surface perpendicular to the optical axis of the collector lens and at least one interval adjustment component dismountably arranged between the end surface of the lens frame and the heat dissipation component, and holds the heat dissipation component to be slidable with respect to the interval adjustment component.

6. The illumination apparatus according to claim 1, wherein the main body of the apparatus holds the light source unit to be freely mountable and dismountable.

7. The illumination apparatus according to claim 1, wherein the main body of the apparatus has a relay optical system for forming an image of the semiconductor light emitting element by converging the illumination light in collaboration with the collector lens.

8. The illumination apparatus according to claim 7, wherein the relay optical system is configured such that the image of the semiconductor light emitting element is formed near a pupil of an objective lens that is optically connected to the main body of the apparatus.

* * * * *

UNITED STATES PATENT AND TRADEMARK OFFICE
CERTIFICATE OF CORRECTION

PATENT NO. : 7,841,744 B2  Page 1 of 1
APPLICATION NO. : 12/142936
DATED : November 30, 2010
INVENTOR(S) : Masahito Tonooka It is certified that error appears in the above-identified patent and that said Letters Patent is hereby corrected as shown below:

Column 14, Line 29-31, Claim 9:

After Claim 8, insert the following new claim 9:

--9. The illumination apparatus according to claim 1, wherein the lens frame has a movement mechanism which changes a relative position of the heat dissipation component with respect to the collector lens along the direction of the optical axis of the collector lens.--.

Signed and Sealed this
Fourteenth Day of August, 2012

David J. Kappos
*Director of the United States Patent and Trademark Office*

UNITED STATES PATENT AND TRADEMARK OFFICE
CERTIFICATE OF CORRECTION

| | | Page 1 of 2 |
|---|---|---|
| PATENT NO. | : 7,841,744 B2 | |
| APPLICATION NO. | : 12/142936 | |
| DATED | : November 30, 2010 | |
| INVENTOR(S) | : Masahito Tonooka | |

It is certified that error appears in the above-identified patent and that said Letters Patent is hereby corrected as shown below:

Delete the title page and substitute therefore the attached title page showing the corrected number of claims in patent.

Column 14, Line 29-31, Claim 9:

After Claim 8, insert the following new claim 9:

--9. The illumination apparatus according to claim 1, wherein the lens frame has a movement mechanism which changes a relative position of the heat dissipation component with respect to the collector lens along the direction of the optical axis of the collector lens.--.

This certificate supersedes the Certificate of Correction issued August 14, 2012.

Signed and Sealed this
Fourth Day of September, 2012

David J. Kappos
*Director of the United States Patent and Trademark Office*

CERTIFICATE OF CORRECTION (continued)

(12) United States Patent
Tonooka

(10) Patent No.: US 7,841,744 B2
(45) Date of Patent: Nov. 30, 2010

(54) ILLUMINATION APPARATUS

(75) Inventor: Masahito Tonooka, Hino (JP)

(73) Assignee: Olympus Corporation, Tokyo (JP)

( * ) Notice: Subject to any disclaimer, the term of this patent is extended or adjusted under 35 U.S.C. 154(b) by 230 days.

(21) Appl. No.: 12/142,936

(22) Filed: Jun. 20, 2008

(65) Prior Publication Data
US 2009/0016059 A1    Jan. 15, 2009

(30) Foreign Application Priority Data
Jun. 21, 2007   (JP)   ............... 2007-164205

(51) Int. Cl.
*F21S 8/00* (2006.01)
(52) U.S. Cl. ............... 362/268; 362/294; 359/390
(58) Field of Classification Search .......... 362/268, 362/294, 373; 359/385, 387, 389, 390, 368
See application file for complete search history.

(56) References Cited

U.S. PATENT DOCUMENTS

| | | | |
|---|---|---|---|
| 2,471,879 A | * | 5/1949 | Lowber et al. ............ 359/389 |
| 2,959,097 A | * | 11/1960 | Mollring ............ 359/385 |
| 3,297,391 A | * | 1/1967 | Benford et al. ............ 359/389 |
| 3,499,715 A | * | 3/1970 | Baumgartner et al. ....... 356/397 |
| 7,586,677 B2 | * | 9/2009 | Bertschi et al. ............ 359/385 |

FOREIGN PATENT DOCUMENTS

JP   2006-113392 A   4/2006

* cited by examiner

*Primary Examiner*—John A Ward
(74) *Attorney, Agent, or Firm*—Holtz, Holtz, Goodman & Chick, PC

(57) ABSTRACT

The illumination apparatus comprises a light source unit which has a LED for emitting illumination light, and a condenser lens for collecting the illumination light, and a main body of the illuminator of the apparatus which holds the light source unit and guides the illumination light. The light source unit comprises a heat dissipation plate which holds LED, and emits the heat emitted from LED 11; and a lens frame which holds the collector lens and the heat dissipation plate so that the relative position of LED to the collector lens may be changed. The main body of the illuminator has a connection hole for connecting communicatively the inside of the main body of the apparatus to the outside, and holds the light source unit by inserting the lens frame into the connected hole.

9 Claims, 10 Drawing Sheets